March 31, 1931.   N. W. KELLER   1,799,101
TURBINE ENGINE
Filed Sept. 3, 1929   2 Sheets-Sheet 1

Inventor
Noah W. Keller
By Townsend, Loftus & Abbett
Attorneys

March 31, 1931.   N. W. KELLER   1,799,101
TURBINE ENGINE
Filed Sept. 3, 1929   2 Sheets-Sheet 2

Inventor
Noah W. Keller
By Townsend, Loftus & Abbett
Attorneys

Patented Mar. 31, 1931

1,799,101

UNITED STATES PATENT OFFICE

NOAH W. KELLER, OF LOS ANGELES, CALIFORNIA

TURBINE ENGINE

Application filed September 3, 1929. Serial No. 389,977.

This invention relates to a reversible rotary turbine.

It is the principal object of the present invention to provide a turbine structure which is decidedly simple in its construction, and which will efficiently operate under fluid pressure to rotate a diving shaft, said turbine being readily controlled so that it may be driven in an advance or reverse direction without the use of gearing or clutches and without causing undue strain upon the parts of the structure.

The present invention contemplates the provision of a shaft carrying a dual rotor enclosed within a suitable housing and being disposed in operative relation to a dual stator, said structure being alternately supplied at opposite ends with fluid under pressure by which the rotor may be driven in a predetermined direction.

The invention is illustrated by way of example in the accompanying drawings in which.

Figure 1:
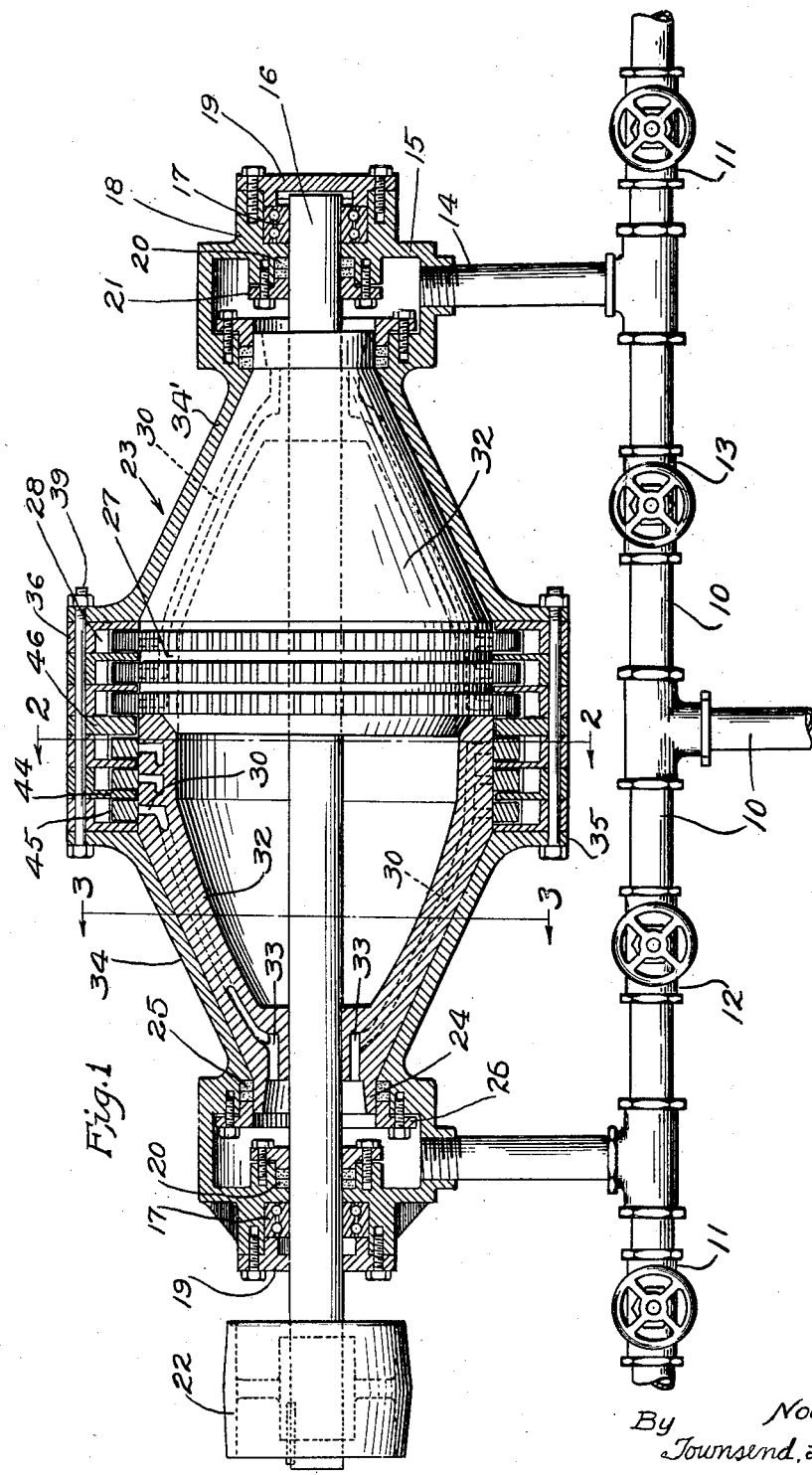
Figure 1 is a view in vertical section and elevation showing the assembled turbine.

Referring more particularly to the drawings, 10 indicates a supply pipe fitted with a cut-off valve 11 and feed valves 12 and 13. The pipe 10 may be supplied with any fluid under pressure whether gaseous or liquid and the valves may be regulated so that the fluid under pressure may be alternately delivered to one end or the other of the turbine, thus making it possible to drive the turbine in either direction. The valve 13 is provided with a pipe 14, connecting with a fluid pressure chamber 15. A rotor shaft 16 extends through this chamber and is mounted in an anti-friction bearing structure 17 carried in a boss 18 formed on the end wall of the fluid chamber 15. A cap 19 is secured over the end of the shaft 16 and holds the anti-friction bearing in position. Suitable packing washers 20 are mounted upon the shaft 16 within the fluid chamber and are held in position by a packing collar 21 so that fluid will not leak outwardly from the fluid chamber 15 and around the shaft 16. The opposite end of the shaft 16 is shown as extending through the cap 19 where it receives a pulley 22. This end of the shaft is likewise fitted with anti-friction bearing 17 and packing washers 20.

Mounted upon the shaft 16 is a dual rotor structure 23. This structure is in the shape of two oppositely disposed cones with their bases co-incident and with their central axes longitudinally aligned. The outer ends of these cones are formed with cylindrical portions 24 which are circumscribed by packing washers 25 held in position by packing collars 26. The portion of the rotor 23 which occurs centrally thereof and upon opposite sides of the center transverse axis is cylindrical and carries sets of oppositely pitched nozzle rings 27 which are circumscribed by stator rings 36.

Figure 2:
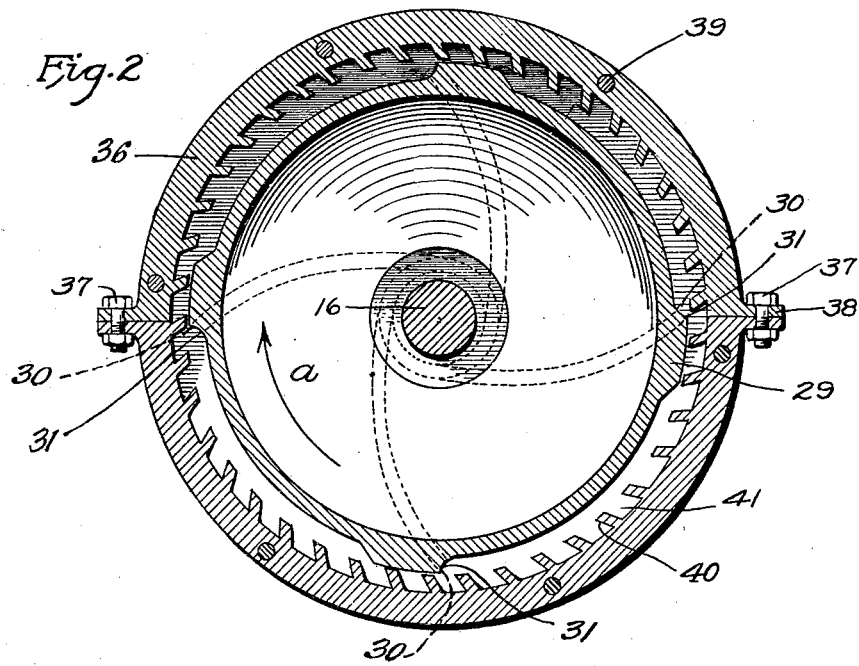
Fig. 2 is a view in transverse section through the turbine as seen on the line 2—2 of Fig. 1, and showing the relation of the rotor vanes to the stator vanes.

As shown in Fig. 2 of the drawings, the nozzle rings have a plurality of nozzle members 29 through which openings 30 occur. The outside face of the nozzle members 29 are co-incident with and circularly concentric with the axis of the shaft 16. The openings 30 occur in the rear incline face 31 of each of the nozzle members 29 and extend spirally and longitudinally of the rotor shell 32 to communicate with a distributing ring 33 formed in the ends of the rotor structure and in direct communication with the fluid chamber 15. The stator with its nozzle rings are suitably enclosed within a frusto-conical housing 34 and 34', the outer ends of which are formed integral with the fluid pressure chamber 15, and the inner ends of which are formed with an annular bolting flange 35 spaced from each other equi-distant upon the opposite sides of the transverse center of the turbine. Disposed between the bolting flanges 35 is a set of stator rings 36. These rings are more clearly shown in Fig. 2 of the drawings as being in halves which part along the horizontal center of the machine and are bolted together by bolts 37 passing through lugs 38 extending from the circumferential edge of the rings. The outer face of each ring is otherwise circular and agrees in diameter with the diameter of the bolting flanges 35. Bolts 39 extend through openings in the body of the rings and through the bolting flanges 35 so that the rings and the two halves of the housing are securely held together, but are readily separable if desired. The inner circumferential face of each of the rings is formed with a plurality of inclined vanes 40 which are pitched at an angle substantially agreeing with the angle of the openings 30 in the nozzles 29 when these openings are in substantial register with the pockets 41 between the vanes, and by which impulse action is given to the rotor as the fluid under pressure is released and is projected into the inclined pockets. It is to be understood that the set of nozzles and stator vanes on one side of the transverse center of the turbine are inclined oppositely from the set of nozzles and stator vanes on the opposite side of the transverse center of the turbine, and that fluid is alternately delivered to the two sets of nozzles and vanes, whereby a reversal of direction of rotation of the rotor and its shaft may be effected.

Figure 3:
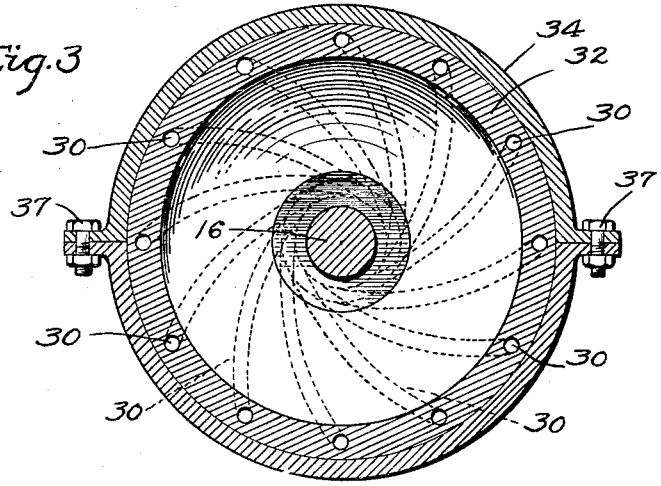
Fig. 3 is a view in transverse section through the structure as seen on the line 3—3 of Fig. 1 and showing the radial and spiral travel of the fluid to the vanes.

In operation, the fluid under pressure is delivered to the pipe 10 and may be directed to opposite ends of the turbine by alternately opening and closing the valves 12 and 13. On the side of the pipe 10 upon which valve 12 or 13 is opened it is necessary to close the exhaust valve 11 and to leave the exhaust valve upon the opposite side open. It will be assumed that the fluid is to be directed to the left end of the turbine as shown in Fig. 1. In this event valve 13 is closed and valve 11 is opened upon the opposite side thereof. The fluid will then pass through the open valve 12 and thence along pipe 14 into the fluid pressure chamber 15 at the left end of the turbine. The fluid will then pass inwardly to the distributing ducts 33 and along the supply passageways to the nozzle openings 30 of the rings 28. Attention is directed to the fact that as shown in Fig. 3 of the drawings the passageways in the body 32 of the rotor extend longitudinally and circumferentially making a long spiral which is generated from a small annular recess at the end of the rotor and which progressively enlarges at the point of eduction at the periphery of the rotor. Attention is also directed to the fact that the nozzles 29 on the various nozzle rings are disposed in spaced circumferential relation to each other as indicated by dotted lines in Fig. 2 of the drawings so that when three nozzles rings are used on each side of the transverse center of the turbine as shown in the drawing, and when each ring carries four nozzles spaced at ninety degrees to each other there will be twelve nozzles in the set of rings spaced at thirty degrees to each other and successively passing the same point of travel as the rotor revolves.

As the fluid under pressure passes outwardly to the nozzle 29 and is projected from the openings 30 against the vanes 40 and into the pockets 41 of the stator rings, the rotor will be given an impulse motion to cause it to rotate in the direction of the arrow "a" as indicated in Fig. 2 of the drawings. It is intended that the fit of the nozzle ring with relation to the stator rings will be sufficiently loose to allow the fluid under pressure to gradually work around the end partition flange 44 of the adjacent stator rings and along the passageway 45. This passageway progressively increases in area as indicated in Fig. 1 of the drawings so that appropriate expansion of the fluid may be permitted as the fluid passes through the various stages of the stator. A partition wall 46 is disposed between the two sets of the stator rings and the nozzle rings. This also fits loosely with relation to the rings and permits the fluid to pass onward, over and around the rings upon the inactive side of the turbine and thereafter along the passageways 30 to the fluid chamber 15, and thence through pipe 14, through valves 11 to the exhaust. When reverse rotation is desired the condition of the valve is just reversed so that the fluid under pressure will enter the turbine at its right end and will be exhausted therefrom at its left end. It will be understood that the capacity and power of the turbine may be varied by increasing or decreasing the number of nozzle rings and stator rings as well as by varying the diameter of the nozzle ring circle and circumscribing the stator rings.

It will thus be seen that the turbine structure here disclosed is quite simple in its construction, may be inexpensively manufactured, readily assembled, and will efficiently produce rotary motor power which may be easily controlled to move in either of two directions.

While I have shown the preferred form of my invention as now known to me, it will be understood that various changes may be made in the combination, construction and arrangement of parts by those skilled in the art, without departing from the spirit of the invention as claimed.

Having thus described my invention, what I claim and desire to secure by Letters Patent is:

1. A turbine comprising a rotor shaft, a dual rotor thereon in the shape of oppositely extending conical members the bases of which coincide on the transverse center of the rotor, a plurality of spirally arranged fluid pressure ducts extending from the apices of the rotor towards the central enlarged portion of the rotor, nozzle rings circumscribing the rotor adjacent of the center and with which said ducts communicate, nozzles formed as a part of said rings and having openings in communication with the ducts through which fluid under pressure may be projected substantially tangential of the rotor, stator rings circumscribing the nozzle rings and having a plurality of pockets along their inner faces and into which said fluid may be projected from the nozzles, and a housing enclosing the rotor and securing the stator rings in their assembled position with relation to the nozzle rings.

2. A turbine comprising a rotor shaft, a dual rotor thereon in the shape of oppositely extending conical members the bases of which coincide on the transverse center of the rotor, a plurality of spirally arranged fluid pressure ducts extending from the apices of the rotor towards the central enlarged portion of the rotor, nozzle rings circumscribing the rotor adjacent of the center and with which said ducts communicate, nozzles formed as a part of said rings and having openings in communication with the ducts through which fluid under pressure may be projected substantially tangential of the rotor, stator rings circumscribing the nozzle rings and having a plurality of pockets along their inner faces and into which said fluid may be projected from the nozzles, and a housing enclosing the rotor and securing the stator rings in their assembled position with relation to the nozzle rings, and means at opposite ends of the housing for alternately delivering fluid under pressure thereto whereby to rotate said rotor.

3. A turbine comprising a rotor shaft, a dual rotor thereon in the shape of oppositely extending conical members, the bases of which coincide on the transverse center of the rotor, a plurality of spirally arranged fluid pressure ducts extending from the apices of the rotor toward the central enlarged portion of the rotor, a fluid pressure chamber in open communication with said ducts and rotor apices, nozzle rings circumscribing the rotor adjacent of the center and with which said ducts communicate, nozzles formed as a part of said rings and having openings in communication with the ducts through which fluid under pressure may be projected substantially tangential of the rotor, stator rings circumscribing the nozzle rings and having a plurality of pockets along their inner faces and into which said fluid may be projected from the nozzles, and a housing enclosing the rotor and securing the stator rings in their assembled position with relation to the nozzle rings.

NOAH W. KELLER.